United States Patent [19]

Bueltjer et al.

[11] 4,189,559

[45] Feb. 19, 1980

[54] MANUFACTURE OF POLYMERS IN BEAD FORM FROM WATER-SOLUBLE, ETHYLENICALLY UNSATURATED MONOMERS

[75] Inventors: Uwe Bueltjer; Dietmar Jung, both of Ludwigshafen; Hans-Uwe Schenck, Wachenheim; Herbert Spoor, Limburgerhof, all of Fed. Rep. of Germany

[73] Assignee: BASF Aktiengesellschaft, Fed. Rep. of Germany

[21] Appl. No.: 817,253

[22] Filed: Jul. 20, 1977

[30] Foreign Application Priority Data

Jul. 31, 1976 [DE] Fed. Rep. of Germany ....... 2634486

[51] Int. Cl.$^2$ ............................ C08F 2/32; C08F 2/20
[52] U.S. Cl. ..................................... 526/203; 526/200; 526/201; 526/207; 526/210; 526/303
[58] Field of Search .................. 526/201, 203, 56, 207

[56] References Cited

U.S. PATENT DOCUMENTS

| 3,933,763 | 1/1976 | Goretta | 526/203 |
|---|---|---|---|
| 3,948,866 | 4/1976 | Pennewiss | 260/29.6 RW |

*Primary Examiner*—C. A. Henderson
*Attorney, Agent, or Firm*—Keil & Witherspoon

[57] ABSTRACT

Production of polymers in bead form by forming a water-in-oil suspension of an aqueous solution containing at least one water-soluble ethylenically unsaturated monomer in an inert hydrophobic liquid organic dispersion medium and polymerizing the suspended monomer in the presence of a polymerization initiator and a protective colloid obtained by reacting an oily or resinous polymer of an olefin and/or diolefin, said polymer containing hydrogen atoms in the allyl position, with 2 to 30% by weight, based on the oil and/or resin, of maleic anhydride.

3 Claims, No Drawings

MANUFACTURE OF POLYMERS IN BEAD FORM FROM WATER-SOLUBLE, ETHYLENICALLY UNSATURATED MONOMERS

BACKGROUND OF THE INVENTION

The present invention relates to a process for the manufacture of polymers in bead form from water-soluble, ethylenically unsaturated monomers by the inverse suspension polymerization process, in which an aqueous solution of the monomers is suspended in an inert hydrophobic liquid and is polymerized therein in the presence of a polymerization initiator and of a protective colloid, to give polymeric products in bead form.

This process for the manufacture of polymers in bead form from water-soluble, ethylenically unsaturated monomers is disclosed in German Pat. No. 1,081,228. For carrying out the process in practice, the correct choice of a suitable protective colloid is critical. The protective colloids stabilize the water-in-oil emulsions and influence the size of the polymer beads. Examples of protective colloids employed are sorbitan esters, eg. sorbitan monostearate and sorbitan monooleate, oxyethylated fatty acid amides, fatty acid esters of glycerol, sorbitan sesquioleate or sorbitan monooleate together with dicalcium phosphate or hydroxyapatite or silicates. A further group of conventional protective colloids comprises block polymers or graft polymers which contain at least one polymeric hydrophilic portion and one polymeric hydrophobic portion in the molecule. The inverse suspension polymerization process makes it possible to manufacture polymers having particularly high molecular weights and also makes it possible, given a suitable choice of the auxiliary phase, to remove the water directly from the system by azeotropic distillation.

During the polymerization, the aqueous phase of the water-in-oil dispersion passes through a very tacky state. Even after completion of the polymerization the suspended water-containing polymer is not tack-free. As a result, polymer particles can stick to one another and to the walls of the vessel during the polymerization or during the azeotropic dehydration which may be carried out after the polymerization. In extreme cases this phenomenon can reach the point of the entire polymer sticking together in a coherent mass which clings to the stirrer and the walls. The conventional protective colloids have the disadvantage that they do not prevent the formation of deposits on the walls of the polymerization apparatus and on the stirrer.

It is an object of the present invention to provide protective colloids for the inverse suspension polymerization process, described above, by means of which the disadvantages of the conventional protective colloids can very substantially be avoided.

SUMMARY OF THE INVENTION

We have found that the above object is achieved by using, as protective colloids, reaction products which are obtained by reacting oily and/or resinous polymers containing carbon-carbon double bonds and hydrogen atoms in the allyl position to the double bonds with from 2 to 30% by weight of maleic anhydride, based on the oily or resinous polymers.

DETAILED DESCRIPTION OF THE INVENTION

The inert hydrophobic liquid which constitutes the auxiliary phase of the water-in-oil suspension can in principle be any water-immiscible liquid which does not interfere with the polymerization. The use of aliphatic, cycloaliphatic and aromatic hydrocarbons or hydrocarbon mixtures is preferred.

According to the invention, any water-soluble monomer can be polymerized by the inverse suspension polymerization process to give a polymer in bead form. The process is of importance, above all, for polymerizing amides of ethylenically unsaturated carboxylic acids of 3 or 4 carbon atoms, eg. acrylamide and methacrylamide, and for the manufacture of copolymers of the said amides with other ethylenically unsaturated monomers which are water-soluble, eg. acrylic acid, methacrylic acid, their lithium sodium, potassium and ammonium salts and other ethylenically unsaturated carboxylic acids and their salts which are copolymerizable with the amides, substituted acrylamides, eg. N-methylolacrylamide and N-methylolmethacrylamide, basic esters of carboxylic acids of 3 or 4 carbon atoms, eg. diethylaminoethyl acrylate and dimethylaminoethyl methacrylate, and the corresponding carboxylic acid amides, eg. diethylaminoethylacrylamide and dimethylaminoethylmethacrylamide.

The polymerization can also be carried out with two or more of the above monomers and also with minor amounts of monomers which are only sparingly water-soluble but readily copolymerize with the said monomers, eg. acrylonitrile or methyl acrylate.

The monomers which are only sparingly water-soluble are employed in an amount of up to 20% by weight, based on the total monomer mixture. The polymerization is carried out by suspending an aqueous solution of one or more monomers in an inert hydrophobic liquid so as to form a water-in-oil suspension. However, this requires the presence of a protective colloid. According to the invention, the protective colloids used are reaction products of oils and/or resins which contain hydrogen atoms in the allyl position with from 2 to 30% by weight of maleic anhydride, based on the oils and resins. These reaction products are known per se. They are obtained by heating the oils and/or resins with maleic anhydride at above 150°, in what is called an ene reaction (H. M. R. Hoffman, Angew. Chem. 81 (1969), 597, and C. P. A. Kappelmeyer et al., Kunststoffe 40 (1950), 81 [(incorporated by reference)]). In general, the reaction is carried out at from 180° to 240°. The presence of a solvent is usually not necessary but may at times be advantageous. For example, aromatic solvents have been employed extensively. In principle, all solvents can of course be used, provided they are inert. If excess maleic anhydride is left unconverted after the reaction, it can be distilled off under reduced pressure (U.S. Pat. No. 3,518,213). To display their activity as protective colloids, the products must be soluble in the inert hydrophobic liquid. However, during the ene reaction, the oils and/or resins frequently undergo crosslinking side-reactions, which lead to insoluble products, if oxygen is present (Houben-Weyl, Methoden der Organischen Chemie, volume 14/2, 771 (1963)). In general, the reaction must therefore be carried out under an inert gas. Additives which suppress such side-reactions have also been disclosed.

Suitable oils and resins are above all copolymers of olefins and diolefins of 4 to 6 carbon atoms. Examples of suitable diolefins are butadiene, cyclopentadiene, cyclohexadiene, isoprene, piperylene and methylcyclopentadiene.

The oils and resins generally have a molecular weight of from about 750 to 50,000, preferably from 1,000 to 3,000. They may or may not be modified with other ethylenically unsaturated monomers, eg, with styrene, methylstyrene, indene, acrylic esters and methacrylic esters.

The only critical aspect is that the resulting oil or resin must contain carbon-carbon double bonds and hydrogen atoms in the allyl position to the double bonds, so that these products can be reacted with maleic anhydride in the manner of an ene reaction.

The monomer concentration in the aqueous monomer solution can be varied within wide limits and is in general from 15 to 80%. The upper limit is above all determined by the solubility of the monomers, whilst the lower limit is as a rule imposed by economic reasons.

The protective colloids are generally employed in an amount of from 0.01 to 2% by weight, based on the oil phase of the water-in-oil suspension. The proportion of the inert hydrophobic liquid in the composition of the water-in-oil suspension is generally from 40 to 90% by weight.

The conventional free radical polymerization initiators, eg. peroxides, hydroperoxides and azo compounds, in the conventional amounts, are employed for polymerizing the monomers.

Polymers in bead form are obtained, which, on azeotropic removal of the water, are in the form of dry products. For the purposes of the invention, polymers in bead form also include those of which the particles, of from 0.2 to 5 mm in size, consist of several smaller intergrown particles. The advantage of the process according to the invention is, above all, that only an extremely slight deposit, if any, is observed on the polymerization apparatus and equipment. A further advantage is that by using the protective colloids the particle size distribution of the polymers can be controlled more effectively than is possible with the conventional protective colloids.

The Examples which follow illustrate the process of the invention. The percentages in the Examples are by weight, and the parts given below are by weight. The number-average molecular weights of the oils and resins were measured by vapor pressure osmometry in benzene at various concentrations, extrapolated to a value of 0. The following protective colloids were used:

Protective colloid A: a reaction product of 10 parts of maleic anhydride (MA) and 90 parts of a commercial polybutadiene oil of molecular weight 1,500, which contains 75% of cis-1,4 double bonds, 24% of trans-1,4 double bonds and 1% of vinyl double bonds (polybutadiene oil I). The reaction was carried out at from 180° to 200° C.

Protective colloid B: a reaction product of 7.5 parts of MA and 92.5 parts of the commercial polybutadiene oil I; reaction temperature from 180° to 200° C.

Protective colloid C: a reaction product of 5 parts of MA with 95 parts of a commercial polybutadiene of molecular weight 3,000, which contains 80% of cis-1,4 double bonds, 19% of trans-1,4 double bonds and 1% of vinyl double bonds, the product being manufactured at from 180° to 200° C.

Protective colloid D: a reaction product of 10 parts of MA and 90 parts of a commercial polybutadiene oil of molecular weight 1,500, which contains from about 40 to 45% of trans-1,4 double bonds, from 30 to 40% of cis-1,4 double bonds and from 20 to 25% of vinyl double bonds (polybutadiene oil II). The reaction was carried out at from 180° to 200° C.

Protective colloid E: a reaction product of 20 parts of MA and 80 parts of polybutadiene oil II, manufactured at from 180° to 200° C.

Protective colloid F: a reaction product of 7.5 parts of MA and 32.5 parts of polybutadiene oil II, manufactured at from 180° to 200° C.

Protective colloid G: a reaction product of 7.9 parts of MA and 92.1 parts of a resin which was obtained by cationic polymerization of a naphtha cracking distillate (which had a boiling point of from 35° to 160° C. and a double bond content corresponding to 114 g of bromine per 100 g of distillate) with boron trifluoride as the catalyst, at 40° C. Before the reaction with MA, which was carried out at from 180° to 200° C., the non-polymerizable constituents of the distillate were removed. The resin has a molecular weight of 1,250.

EXAMPLE 1

1.5 g of protective colloid A, 1.6 l of cyclohexane and 30 g of water were introduced into a 5 l stainless steel kettle equipped with heating, an impeller stirrer, a thermometer, a reflux condenser and a cascade of 2 dropping funnels. After having thoroughly flushed the kettle with nitrogen, the materials introduced were heated and the pressure in the kettle reduced to cause the contents to boil under reflux at 50° C.

184 g of acrylamide, 80 g of acrylic acid and 280 mg of sodium hexametaphosphate were then dissolved in 436 g of water and the pH was brought to 7 with 80 g of a 50% strength sodium hydroxide solution. 25 ml of a 10% strength aqueous ammonia solution and 8.8 ml of a 1% strength aqueous potassium peroxydisulfate solution were added to the above solution and the mixture was introduced into the upper dropping funnel of the cascade. From there, it ran into the 2nd dropping funnel from which it was fed, at the rate at which it entered, continuously into the kettle. A stream of nitrogen constantly bubbling through the solution in the lowwer funnel served to remove dissolved oxygen. The period of addition was 1 hour and the stirrer speed 225 rpm. The polymerization was continued for a further hour under the stated conditions, 16 ml of a 1% strength aqueous hydroxylammonium sulfate solution were added and the water was removed by azeotropic distillation under atmospheric pressure. The anhydrous suspension was run out and the kettle was flushed with cyclohexane. Less than 2 g of product remained in the kettle. The suspension was filtered and the product was dried under reduced pressure. It consisted of spherical particles of from 0.1 to 3 mm in size.

EXAMPLE 2

Example 1 was repeated except that 1.5 g of the protective colloid A were employed. A spherical polymer with a bead size of from 0.1 to 2 mm was obtained. The deposit in the kettle amounted to only 0.8 g.

EXAMPLE 3

Example 1 was repeated except that in place of protective colloid A, 2.0 g of protective colloid B were employed. About 1.5 g of the product formed a deposit in the polymerization kettle.

EXAMPLE 4

Example 1 was repeated except that instead of the protective colloid A, 0.9 g of the protective colloid D was employed. No deposit formed in the kettle. The polymer consisted of beads of from 1 to 5 mm diameter.

The Example was repeated with 2.5 g of the protective colloid B. After completion of the polymerization, 2.7 g of product remained as a deposit in the kettle. The polymer consisted of round beads of from 0.1 to 2 mm in size.

EXAMPLE 5

Example 1 was repeated but instead of protective colloid A, 0.6 g of protective colloid E was employed. 2.0 g of deposit formed in the polymerization vessel. The beads were from 0.1 to 2 mm in size.

EXAMPLE 6

2 l of cyclohexane, 3 g of protective colloid G and 10 g of water was introduced into the polymerization apparatus described in Example 1. A solution of 298 g of acrylamide, 72 g of acrylic acid and 420 mg of sodium hexametaphosphate in 806 ml of water is then prepared. This solution is brought to a pH of 7 by means of 80 g of 50% strength sodium hydroxide solution. After adding 4 ml of 10% strength ammonia and 12 ml of 1% strength potassium peroxydisulfate solution, the mixture is run, from a dropping funnel which is constantly flushed by a vigorous stream of nitrogen, over 10 minutes into the initial contents of the polymerization apparatus, which boil under atmospheric pressure and are stirred at 225 rpm. After a polymerization time of one hour, 7 ml of a 1% strength hydrazine hydrate solution are added and the water is removed by azeotropic distillation. The kettle remains free from caked-on material. A polymer in the form of spherical beads of from 0.1 to 2 mm is obtained.

Example 6 is repeated except that a total of 9 ml of ammonia is employed and the polymerization is carried out at 60° C. under reduced pressure, set so as to cause the mixture to boil. The kettle remains free from deposit. The particle size is from 0.1 to 1 mm.

EXAMPLE 7

238.5 g of acrylamide, 57.5 g of acrylic acid and 350 mg of sodium hexametaphosphate were dissolved in 640 g of water and the solution was brought to pH 7 with 64 g of 50% strength sodium hydroxide solution. 9 ml of 10% strength ammonia and 10 ml of 1% strength potassium peroxydisulfate solution were added and the polymerization was carried out by the method described in Example 1, under atmospheric pressure. The initial reactor charge consisted of 2.0 g of protective colloid D, 1.6 l of cyclohexane and 30 ml of water. Before azeotropic drying, 10 ml of a 1% strength hydroxylammonium sulfate solution were added. Spherical polymer particles of from 0.1 to 2 mm in size were obtained. The deposit on the walls of the polymerization apparatus amounted to 1 g.

EXAMPLE 8

1.6 l of cyclohexane, 4 g of protective colloid D and 30 ml of water were introduced into the apparatus described in Example 1. The polymerization was carried out under atmospheric pressure by the method described in Example 1, a solution of 300 g of acrylamide, 12 g of sodium bicarbonate, 210 mg of sodium hexametaphosphate and 100 mg of thiourea in 574 g of water, with the addition of 15 ml of a 1% strength aqueous potassium peroxydisulfate solution, being added to the initial charge. After completion of the polymerization, 15 ml of a 1% strength hydroxylammoniumsulfate solution were added and the water was removed from the polymerization vessel by azeotropic distillation. A polymer with particle sizes of from 0.4 to 4 mm was obtained. 3.2 g of deposit were formed in the kettle.

EXAMPLE 9

5 g of protective colloid F, 1.6 l of n-hexane and 30 ml of water are introduced into the apparatus described in Example 1. The mixture is then heated to the boil under atmospheric pressure. A solution of 184 g of acrylamide, 80 g of acrylic acid and 200 mg of sodium hexametaphosphate in 436 g of water, which has been brought to pH 5 with 80 g of a 50% strength sodium hydroxide solution, is then mixed with 20 ml of a 10% strength aqueous ammonia solution and 8.8 ml of a 1% strength aqueous potassium peroxydisulfate solution. The procedure thereafter corresponds to that described in Example 1, except that the polymerization is carried out under atmospheric pressure. A polymer with particle sizes of from 0.5 to 4 mm is obtained. No deposit had formed in the polymerization kettle.

EXAMPLE 10

Example 1 was repeated except that the protective colloid employed was 1.5 g of product C. 2 g of deposit were formed on the walls of the kettle. The polymer consisted of beads of from 0.2 to 3 mm.

COMPARATIVE EXAMPLE 1

Example 2 was repeated except that instead of the protective colloid A, sorbitan monostearate was used as the protective colloid. Beads of from 0.2 to 3 mm were obtained. 34 g of deposit were formed on the walls.

COMPARATIVE EXAMPLE 2

Example 2 was repeated except that instead of the protective colloid A, oil-soluble ethylcellulose was employed as the protective colloid. The polymer was in the form of beads of from 0.2 to 3 mm in size. In this case, 22 g of deposit were formed on the walls.

COMPARATIVE EXAMPLE 3

The protective colloid employed was the product prepared according to Example A of German Laid-Open Application DOS No. 2,009,218. The procedure described in Example 1 above was followed, but instead of protective colloid A 8.0 g of the 40% strength suspension of the conventional protective colloid were used in the polymerization was carried out with the stirrer running at 300 rpm. The particle size was from 0.2 to 4 mm. 22 g of the product remained in the kettle as a deposit on the walls.

We claim:

1. In a process for the production of polymers, in bead form, of water-soluble ethylenically unsaturated monomers by forming a water-in-oil suspension of an aqueous solution containing at least one water-soluble ethylenically unsaturated monomer in an inert hydrophobic liquid organic dispersion medium and polymerizing the suspended monomer in the presence of a protective colloid and a polymerization initiator, the improvement which comprises using as protective colloid a reaction product obtained by reacting an oily or resinous polymer having a molecular weight of from 750 to 50,000 of a member selected from the groups consisting of an olefin and a diolefin having two to six carbon atoms, said polymer containing hydrogen in the allyl position, with 2 to 30% by weight, based on the oil and/or resin, of maleic anhydride, said reaction product being soluble in the inert hydrophobic liquid organic dispersion medium.

2. A process as claimed in claim 1, wherein 0.01 to 2% by weight, based on the inert hydrophobic liquid dispersion medium, of the suspending agent is used.

3. A process as claimed in claim 1, wherein an oil of polybutadiene having a molecular weight of from 1,000 to 30,000 is reacted with maleic anhydride at temperatures of from 180° to 240° C.

* * * * *